April 6, 1926. Re. 16,309

M. MURPHY

ELECTRIC SADIRON

Original Filed April 9, 1924

INVENTOR,
MORTON MURPHY,
By Minturn & Minturn,
Attorneys.

Reissued Apr. 6, 1926. Re. 16,309

UNITED STATES PATENT OFFICE.

MORTON MURPHY, OF RUSHVILLE, INDIANA.

ELECTRIC SADIRON.

Original No. 1,526,431, dated February 17, 1925, Serial No. 705,155, filed April 9, 1924. Application for reissue filed December 24, 1925. Serial No. 77,662.

*To all whom it may concern:*

Be it known that I, MORTON MURPHY, a citizen of the United States, residing at Rushville, in the county of Rush and State of Indiana, have invented a new and useful Improvement in Electric Sadirons, of which the following is a specification.

Electric sad irons, for domestic use particularly, are operated by unskilled persons who through misuse or carelessness burn out the heating element, and frequently use the iron so hot as to damage the clothes.

The object of this invention is to assemble the resistance wires for the heating element on a flat sheet of insulation which is slidingly inserted in the body of the iron and withdrawn in the same manner for renewal or repairs.

Another object is to provide insulation sheets of selective thicknesses and resistance for sliding insertion below the heating element to keep the bottom or ironing surface of the iron from overheating, and also to provide a like slidingly placed and withdrawn insulation above the heating element to prevent over-heating of the handle.

I accomplish the above principal objects and other minor ones which will hereinafter appear, by the mechanism illustrated in the accompanying drawing, in which—

Figure 1:
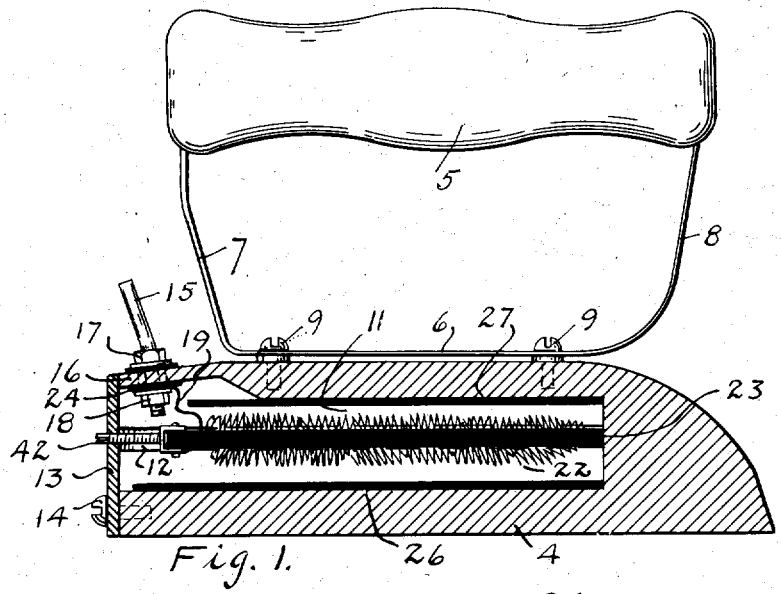
Figure 3:
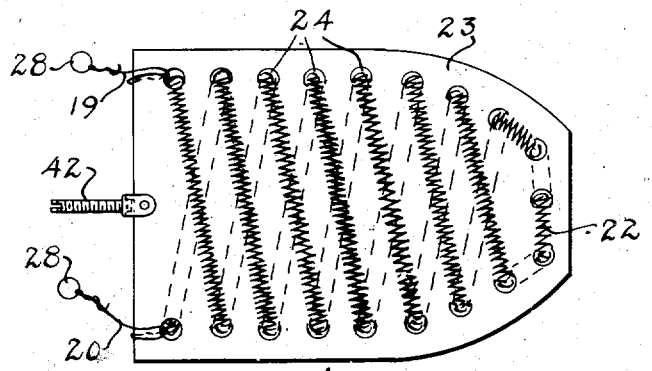
Figure 2:
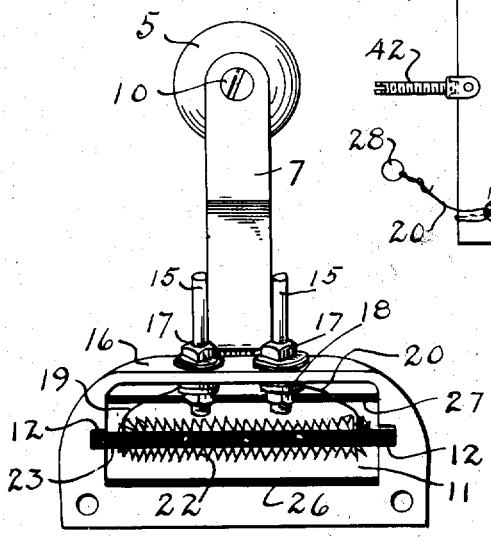

Fig. 1 is a longitudinal vertical section of my improved iron assembled. Fig. 2 is a rear end elevation of same with the end plate closure removed to show the interior arrangement of parts, and Fig. 3, is a top plan view of the heating element comprising wires on a flat sheet of insulation, detached from the rest of the iron.

Like characters of reference indicate like parts in the several views of the drawing.

The body 4 of the iron is cast in any usual and suitable size and external shape. A handle 5 is supported by a strap metal member having a horizontal portion 6, and upwardly bent ends 7 and 8. The portion 6 is secured by two screws 9, 9, to the top of the iron in the manner shown, and the handle 5, is recessed at each end to receive the terminals of ends 7 and 8, which are secured by screws 10, to the handle.

The interior of the body 4 is made hollow by a rectangular recess 11, in cross section, extending from the rear toward the tapering front end for a distance approximately as shown in Fig. 1. This is cored out in casting the body, and at the same time longitudinal grooves 12, 12, are formed, one in each of the vertical walls of the recess about midway between the upper and lower horizontal walls of said recess, in the manner as shown in Figs. 1 and 2. The recess 11 is closed at its rear end by the plate 13, which is removably secured by screws 14, 14.

A pair of socket pins 15, 15, for the attachment thereto of the usual circuit connection (not shown) are seated in the rearwardly sloping roof 16, of the iron, so sloped to increase the clearance between the pins and the handle member 7. The pins are insulated from the roof 16, and are threaded at their inner ends to receive the nuts 17 and 18, on either side of the roof, the under or inner side of the roof being recessed to increase the clearance for the accommodation of a pair of metal washers between the nut 18 and the roof 16, between which the conducting wires 19 and 20, are respectively held. The increased clearance secured by said recess reduces the danger of short-circuiting, which is further lessened by extending the top insulation sheet under the recess in the manner shown in Fig. 1, into close proximity with the nut 18.

The heating element comprises a spirally wound resistance wire 22 and a sheet 23 of asbestos or other insulation of sufficient thickness and stiffness. The sheet 23 has a series of marginal perforations 24, through which the wire coils are wound from side to side in the manner shown, to provide the required length of wire in the circuit. The ends of the wire are looped through the last holes near the broad or rear end of the insulation 23, and around the adjacent end of the insulation to hold the wires in place, and then the extreme ends terminate with round loops 28, ready for insertion on the respective binding posts under their nuts 17 and 18. This heating element is assembled in the hollow of body 4 by sliding the edges of the sheet 23 in the grooves 12, 12, in the manner shown and connecting the ends of the resistance wire with the binding posts as above described.

An adjustment of the heating element longitudinally of the iron is secured by a screw 42, passing through an extended hole in the closure 13.

A sheet of mica or other suitable insulation, 26, is introduced between the heating element and the bottom of the iron, within the hollow interior of the latter, and a similar sheet of insulation 27, is introduced between the heating element and the top of the iron, in the manner shown. A plurality of layers of the insulation 26 and 27 will preferably be used instead of a single thick piece, in order to afford regulation by varying the number used, as the current and other conditions of use may require, to keep from overheating the iron and burning the clothes or the hand of the operator. In case of breakage of the heating element, these insulations 26 and 27 also serve to electrically insulate the iron body from the broken ends of the element. There is space enough in the hollow interior to receive a maximum number of insulating sheets, and as they rest loosely upon the bottom of the hollow interior or upon the heating element, the number of sheets of insulations can be varied easily by any inexperienced person, and as the sheet with the heating element is easily slid into place and is as easily withdrawn in like manner, it can be taken out easily and quickly by an inexperienced person, for repairs or for renewal. Barring these repairs and renewals which are cheaply made, the iron is practically indestructible in the hands of inexperienced users.

Having thus fully described my invention, what I claim as new and wish to secure by Letters Patent of the United States, is—

1. A sad iron having a hollow interior substantially rectangular in cross section and having a longitudinal groove in each side wall intermediate the top and bottom of the hollow interior, a heating element mounted on a sheet supported by the grooves which it slidingly enters from their ends, and an insulation sheet slidingly inserted in the hollow interior below the heating element, and a second insulation sheet slidingly inserted therein above the heating element.

2. A sad iron having a hollow interior substantially rectangular in cross section and having a longitudinal groove in each side wall intermediate the top and bottom of the hollow interior, a heating element mounted on a sheet of insulation and supported by the grooves in which the sheet is slidingly entered from their ends, an insulation sheet slidingly inserted in the hollow interior below the heating element, a second insulation sheet slidingly inserted above the heating element, and means for varying the insulation below and above the heating element.

3. A sad iron having a hollow interior substantially rectangular in cross section and having a longitudinal groove in each side wall intermediate the top and bottom of the hollow interior, a heating element mounted on a sheet of insulation and supported by the grooves by the entrance therein of the sheet, a second sheet of insulation slidingly inserted in the hollow interior of the iron below the heating element, and a third sheet of insulation slidingly inserted above the heating element, said second and third insulations being in a plurality of separable and individually removable laminations.

4. A sad iron having a hollow interior substantially rectangular in cross section and a downwardly sloping rear roof, said interior being correspondingly recessed under the sloping roof, a pair of conductor posts passing through the sloping roof and provided with wire attaching means on their inner ends, said hollow iron interior having longitudinal grooves in each side wall, a sheet of insulation slidingly assembled in said grooves, a resistance wire supported by the insulation and connected with the conductor posts, sheet insulation slidingly inserted below the first sheet of insulation and other sheet insulation slidingly inserted above said first sheet of insulation.

5. A sad iron having a hollow interior substantially rectangular in cross section and a downwardly sloping rear roof, said iron interior being correspondingly recessed under the sloping roof, a pair of conductor posts passing through the sloping roof and provided with inner end wire attaching means, said hollow iron interior having a longitudinal groove in each of its side walls, sheet insulation slidingly assembled in said grooves, a resistance wire supported by the insulation and connected with the conductor posts, laminated sheet insulation slidingly inserted below the first sheet of insulation and other laminated sheet insulation slidingly inserted above said first sheet of insulation.

6. A sad iron having a hollow interior substantially rectangular in cross section and a downwardly sloping rear roof, said iron interior being correspondingly recessed under the sloping roof, a pair of conductor posts passing at right angles through the sloping roof and provided with inner end wire attaching means, said hollow iron interior having a longitudinal groove in each of its side walls, sheet insulation slidingly assembled in said grooves, a resistance wire supported by the insulation and connected with the conductor posts, other sheet insulation slidingly inserted below the first sheet insulation, other sheet insulation slidingly inserted above said first sheet of insulation, and means operated outside of the iron for longitudinally adjusting said first sheet of insulation.

7. A sad iron having a hollow interior substantially rectangular in cross-section and having a longitudinal groove in each side wall intermediate the top and bottom of the hollow interior, and a heating element mounted on a sheet, said sheet being slidingly entered in the grooves from the ends and supported thereby.

8. A sad iron having a hollow interior substantially rectangular in cross-section and having a longitudinal groove in each side wall intermediate the top and bottom of the hollow interior, a heating element mounted on a sheet, said sheet being slidingly entered in the grooves from the ends and supported thereby, and one or more insulation members interposed between the heating element and the body of the iron.

Signed at Indianapolis, Indiana, this 5th day of December, 1925.

MORTON MURPHY.